Dec. 15, 1959   E. F. ECHOLDS   2,916,919
INSIDE-OUT GYROSCOPE
Filed May 3, 1956
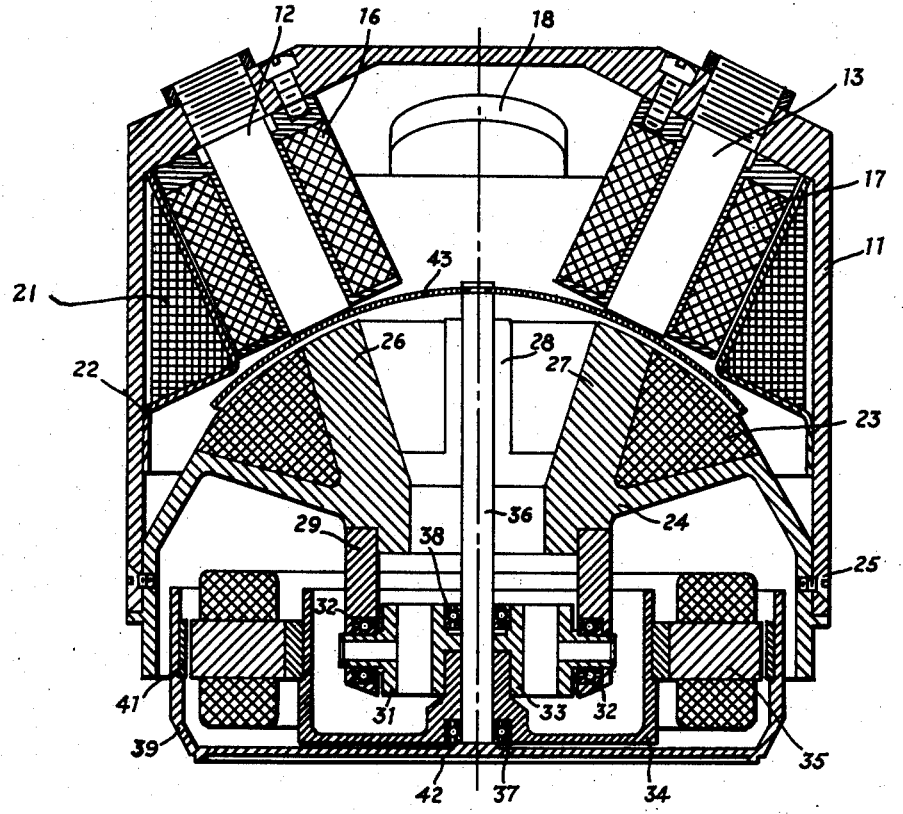
FIG. 2
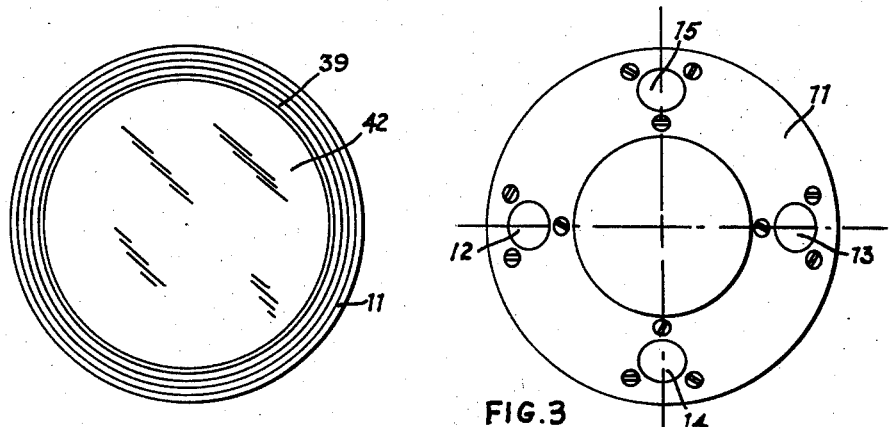
FIG. 1
FIG. 3
INVENTOR.
E. FRANK ECHOLDS
BY
ATTORNEYS

United States Patent Office 2,916,919
Patented Dec. 15, 1959

2,916,919
INSIDE-OUT GYROSCOPE

E. Frank Echolds, Indianapolis, Ind., assignor to the United States of America as represented by the Secretary of the Navy Application May 3, 1956, Serial No. 582,608

4 Claims. (Cl. 74—5.46)

(Granted under Title 35, U.S. Code (1952), sec. 266)

The invention described herein may be manufactured and used by or for the Government of the United States of America for governmental purposes without the payment of any royalties thereon or therefor.

The present invention relates to a gyroscope and more particularly to an eddy-current constrained gyroscope for a gunsight unit wherein a rotating reflecting mirror is used to provide lead angular deviations.

Heretofore gyroscopes for sight units were rotatably driven by a separate motor through a belt drive. A Hooke's joint was provided to give the rotating mirror the necessary degree of freedom required for lead angular deviations. Although this type of gyroscope and mirror drive had wide-spread usage in the past, the arrangement had many inherent disadvantages that were constantly causing trouble, and many attempts were made to improve this type of gyroscope and eliminate the inherent disadvantages. For one thing, the above-mentioned type of gyroscope consumed considerable space due to having a separate motor drive. Also vibration and breakage of the belt drive presented a constant source of trouble. The Hooke's joint also had inherent frictional errors, and had a tendency to center the rotating mirror.

The present invention shows a novel design for an eddy-current constrained gyroscope wherein the separate motor, belt drive, and Hooke's joint are all eliminated, and consequently the inherent disadvantages of these elements are also eliminated. The present invention comprises a gyroscope having a gimbal construction inside the motor driving the gyroscope. A gimballed element supports both the gyro rotor bearings and the gyro motor stator. The gyro stator and rotor extend beyond and surround the gimbal mounting, with the gyro rotor being positioned outside the gyro stator. A mirror is attached to the gyro rotor to provide a reflecting surface for reticle or other images, and a rotating disc spinning in a magnetic field is used to provide for proper deflection of the gyro mirror.

It is therefore a general object of the present invention to provide a compact eddy-current constrained gyroscope in which a gyro mirror is attached to and rotatably driven by a gyro rotor that is supported by a gimbal element.

Other objects and many of the attendant advantages of this invention will be readily appreciated as the same becomes better understood by reference to the following detailed description when considered in connection with the accompanying drawing wherein:

Figure 1 is an end view of the gyroscope showing the gyro mirror;

Figure 2 is a sectional view taken on lines 2—2 of Figure 1; and

Figure 3 is an end view of the gyroscope showing control coils.

Referring now to the drawing, wherein like reference characters designate like or corresponding parts throughout the several views, there is shown a case 11 through which four outer deflection poles 12—15, inclusive, are inwardly directed. Each of the outer deflection poles has a coil wound thereon, coils 16 and 17 serving as elevation coils and coils 18 and 19 (not shown) serving as azimuth coils. The functions of these coils will be described in detail later.

Referring particularly to Figure 2 of the drawing, it can be seen that one range coil 21 is supported by a retaining ring 22, and a second range coil 23 is supported by an annular channel 24 that is fastened, as by screws 25, to the case 11. The annular channel 24 has four inner pole sections, three of which are shown as items 26, 27, and 28 (the fourth pole not being shown), and each of these poles has its end in close proximity to one of the ends of the outer deflection poles. It can be seen that there are only small air gaps between the outer and inner deflection poles, which provide a nearly closed flux path.

A cylindrical member 29 is attached to the annular channel 24 and an outer gimbal ring 31 is pivotally mounted in the cylindrical member 29 by means of bearings 32, which permits the outer gimbal ring 31 to be pivoted in azimuth. An inner gimbal ring 33 is pivotally mounted in bearings (not shown) and this inner gimbal ring is pivotal in elevation. A cup-shaped member 34 is supported by the inner gimbal ring 33, and the field armature 35 of a hysteresis motor is secured to the outer periphery of cup-shaped member 34.

A shaft 36 is rotatably mounted in bearings, one bearing 37 being within the cup-shaped member 34 and another bearing being within the inner gimbal ring 33. Shaft 36 has attached on one end a cup-shaped rotor 39, and a hysteresis ring 41, made of a material having a high hysteresis constant, as for example cobalt alloy, is attached to the inner periphery of the cup-shaped rotor 39. The cup-shaped rotor 39 is made of a non-ferromagnetic material, as for example stainless steel. A mirror 42 is attached to the front face of the cup-shaped rotor 39.

An eddy-current disc 43 is attached to the other end of shaft 36 and is positioned in the air gaps between the inner and outer deflection poles.

In operation the cup-shaped rotor 39 is rotated at a relatively high speed when current is applied to the field armature 35. Since the mirror 42 is attached to the front face of rotor 39, the mirror 42 will be rotated at the speed the rotor is rotating. Shaft 36 will also be driven by the rotor and consequently the eddy-current disc 43 will be spinning in the space between the inner and outer poles. Current is also applied to the control coils 16—19 (not shown), inclusive, and a magnetic field is produced, and when this field is cut by the spinning disc 43, eddy currents are produced in the disc. These eddy currents are electrical currents which flow in small closed paths and the reaction of the field of these currents with the primary magnetic field creates forces which oppose the motion of disc 43. The magnitude of the eddy-current forces may be controlled by the strength of the magnetic field and by controlling the current applied to the control coil the position of disc 43 can be controlled in azimuth and elevation. The sensitivity of the device is controlled by the amount of current applied to range coils 21 and 23.

When the disc 43 is changed in position, the mirror 42 will also be moved as shaft 36 physically connects mirror 42 and disc 43. Thus it can be seen an image, such as a reticle pattern, can be deviated to provide for proper lead necessary in the firing of a trajectory.

The gyroscope described herein is a compact instrument that permits controlling of lead angles for a reflecting reticle. As the hysteresis motor is an integral part of the gyroscope, the need for a separate drive motor and belting arrangements are eliminated. It should be

What is claimed is:

1. An eddy-current constrained gyroscope comprising, a case, a single gimbal element mounted within said case having one inner and one outer ring journaled in connection therewith, a shaft journaled through said inner ring, a hysteresis motor mounted within said case having a stator attached to said inner ring and a rotor attached to said shaft, a mirror attached to one face of said rotor, a plurality of coils attached to said case providing magnetic fields, and an eddy-current disc attached to said shaft and rotatable in said magnetic fields.

2. An eddy-current constrained gyroscope comprising, a case, an annular channel attached to said case and having a plurality of inner poles, a plurality of outer poles having control coils, said outer poles being attached to said case and opposed to said inner poles and separated therefrom to provide an air gap, a single gimbal element attached to said annular channel, a shaft rotatably mounted in said single gimbal element, a rotor having a mirror on one face and attached to one end of said shaft, an eddy-current disc attached to the other end of said shaft and positioned in said air gap between said inner and outer poles, and electrical means mounted to said single gimbal element for rotating said rotor.

3. An eddy-current constrained gyroscope comprising, a case, an annular channel attached to said case and having a plurality of inner poles, a plurality of outer poles having control coils, said outer poles being attached to said case and opposed to said inner poles and separated therefrom to provide an air gap, an outer gimbal ring pivotally mounted to said annular channel, an inner gimbal ring pivotally mounted within said outer gimbal ring, the pivotal axes of said outer and inner gimbal rings being mutually perpendicular, a cup-shaped member attached to said inner gimbal ring and having a hysteresis motor stator on the outer periphery thereof, a shaft journaled through said cup-shaped member and said inner gimbal, a hysteresis motor rotor having a mirror on one face and attached to one end of said shaft, and an eddy-current disc attached to the other end of said shaft and positioned in said air gap between said inner and outer poles.

4. An eddy-current constrained gyroscope comprising, a case, an annular channel attached to said case and having a plurality of inner poles, a plurality of outer poles having control coils, said outer poles being attached to said case and opposed to said inner poles and separated therefrom to provide an air gap, a single gimbal element having one outer gimbal ring pivotally mounted to said annular channel and an inner gimbal ring pivotally mounted inside said outer ring, the pivotal axes of said outer and inner rings being mutually perpendicular, a first cup-shaped member attached to said inner gimbal ring and having the field armature of a hysteresis motor attached on the outer periphery thereof, a shaft journaled through said cup-shaped member and said inner gimbal ring, a cup-shaped rotor attached to one end of said shaft and having a hysteresis ring on the inner peripheral wall surface thereof surrounding said field armature, a mirror fixedly attached to the outer face of said rotor, and an eddy-current disc attached to the other end of said shaft and positioned in said air gap between said inner and outer poles.

References Cited in the file of this patent

UNITED STATES PATENTS

| | | |
|---|---|---|
| 2,378,858 | Mehan | June 19, 1945 |
| 2,527,245 | Cunningham | Oct. 24, 1950 |